Sept. 4, 1962      E. MULITZ      3,052,332

STAIRWAYS

Filed Feb. 21, 1955      9 Sheets-Sheet 1

INVENTOR
Earl Mulitz

BY Karl W. Flocks

ATTORNEY

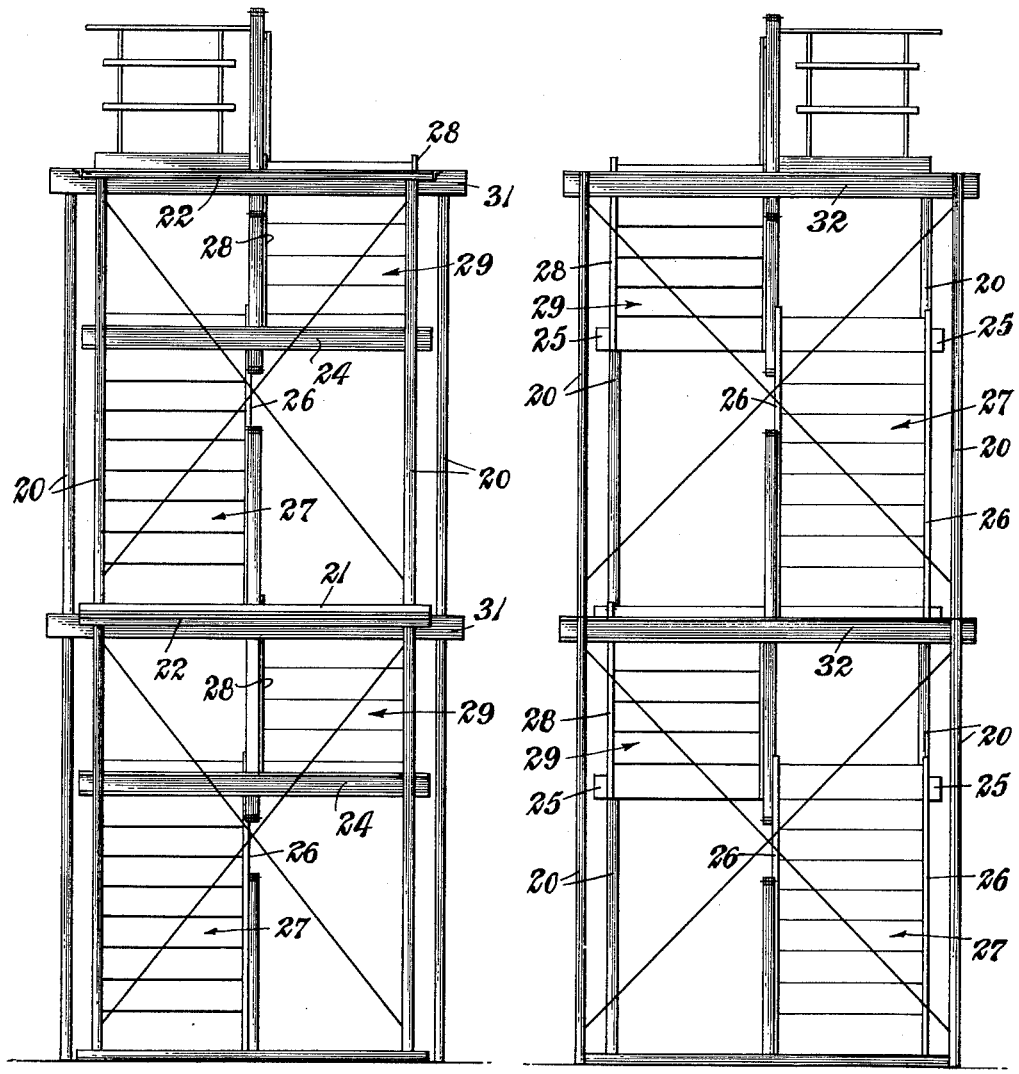

Sept. 4, 1962   E. MULITZ   3,052,332
STAIRWAYS

Filed Feb. 21, 1955   9 Sheets-Sheet 5

INVENTOR
Earl Mulitz.
BY Karl W. Flocks
ATTORNEY

Sept. 4, 1962 E. MULITZ 3,052,332
STAIRWAYS
Filed Feb. 21, 1955 9 Sheets-Sheet 7
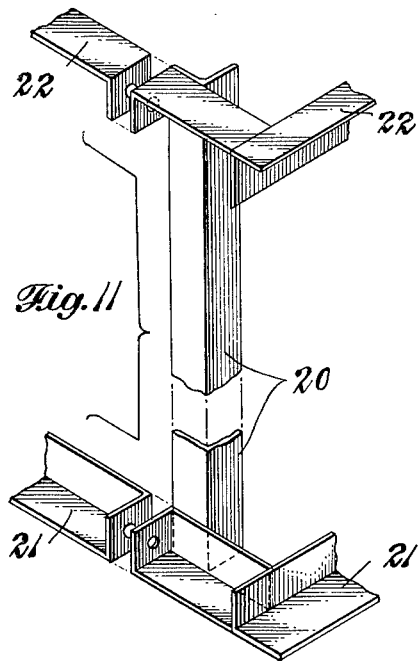
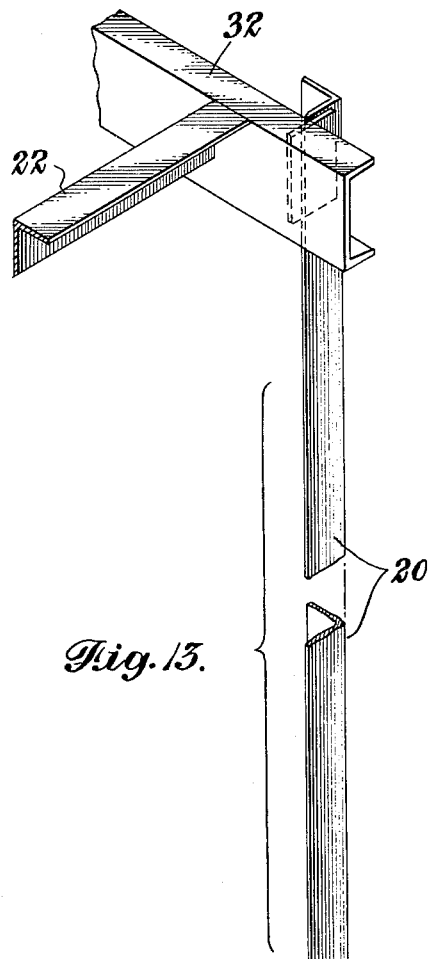
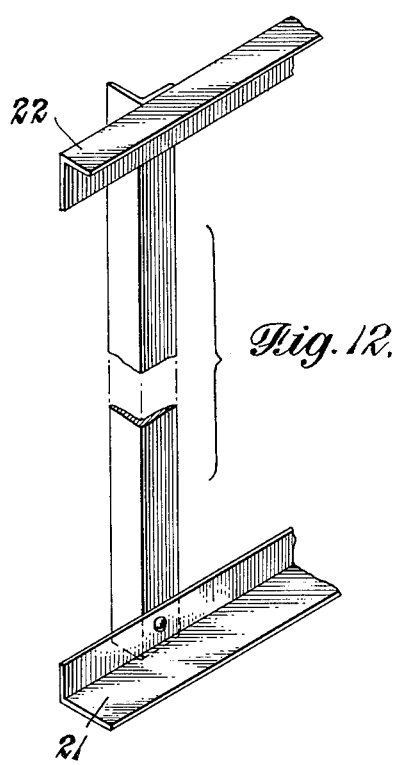
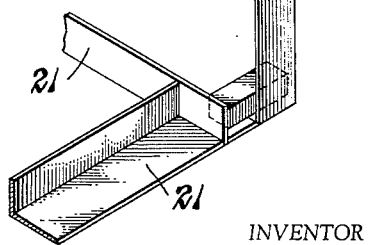
INVENTOR
Earl Mulitz.
BY Karl W. Flocks
ATTORNEY Sept. 4, 1962
E. MULITZ
3,052,332
STAIRWAYS
Filed Feb. 21, 1955
9 Sheets-Sheet 9
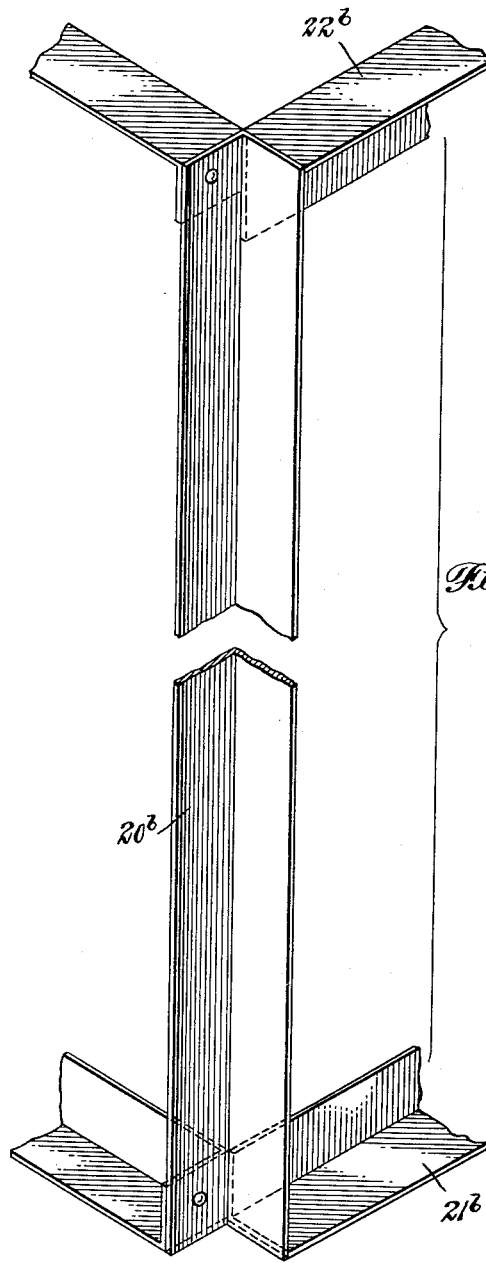
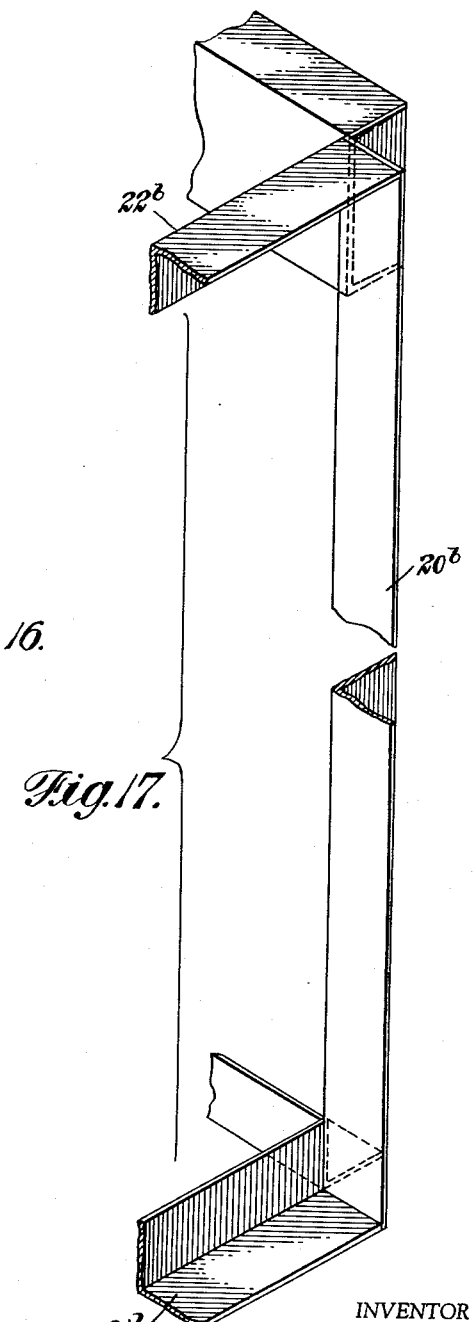
INVENTOR
Earl Mulitz,
BY Karl W. Flocks
ATTORNEY United States Patent Office 3,052,332
Patented Sept. 4, 1962

3,052,332
STAIRWAYS
Earl Mulitz, Washington, D.C., assignor to Potomac Iron Works, Inc., Hyattsville, Md., a corporation of Delaware
Filed Feb. 21, 1955, Ser. No. 489,608
3 Claims. (Cl. 189—43)

This invention relates to stairways and more particularly to prefabricated metal stairways suitable for use in masonry construction.

Prior to the instant invention it has been customary to erect masonry walls within which are fitted stairways such as metal stairways and during the process of construction it has been customary to use temporary scaffolding and while it has been essential to keep the masonry as true as possible to the architect's drawings so that the metal stairway will fit in a square fashion as it is constructed yet due to the fact that the normal tolerances for masonry are not as precise as those for metal working, it has been found necessary to conform the metal stairway out of true to fit the masonry whereas it would have been desirable to do the reverse.

In accordance with the prior practice, the masonry wall structure was brought forward to form a stair well and thereafter steel stringers, steel risers and treads, platforms, frames, plates, newels and railings were brought as components to the job site and fitted and erected within the stair well. Because of tolerances normal to concrete and masonry work, corrections were necessary for the stair work in the field. In many instances, fabrication of stair work was delayed in order to properly coordinate the dimensions with the masonry construction and in some instances it was impossible for installation of stair work to keep pace with construction of the building which made it necessary to have temporary ladders and scaffolds in order to keep construction going.

It is an object of the invention to teach the building of novel prefabricated stairways of such fashion that the stairways may be installed upon a suitable foundation and the masonry walls built up thereabout with the stairway serving as a guide for the masonry wall construction and at the same time serving as temporary stairway and scaffolding during the construction process.

Other objects and the nature and advantages of the instant invention will be apparent from the following description taken in conjunction with the accompanying drawings, wherein:

FIG. 4 is a rear elevation of the structure shown in FIG. 3.

FIG. 5 is a front elevation of the structure shown in FIG. 3.

FIGS. 11, 12 and 13 are views in perspective with parts broken away of typical structural details utilized in the stairways of FIGS. 1–10.

FIGS. 16 and 17 are views in perspective with parts broken away of typical structural details utilized in the stairway of FIGS. 14 and 15.

Figure 1:
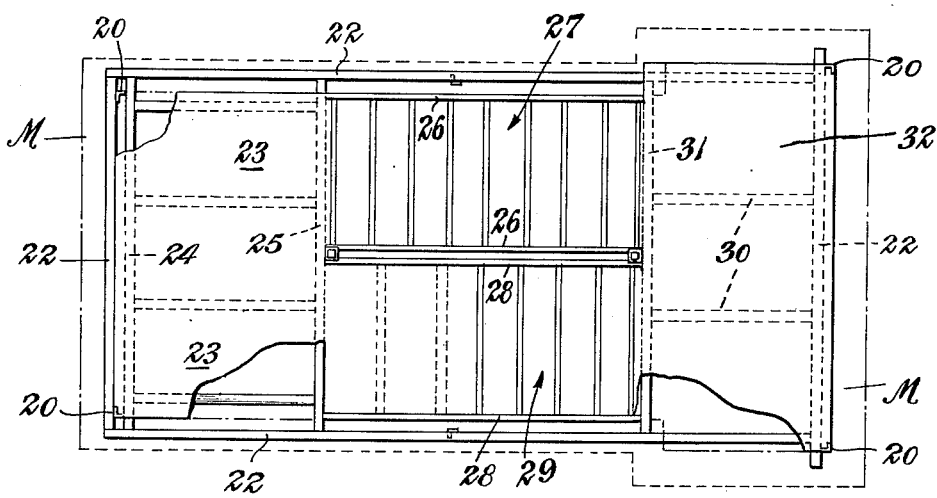
FIGURE 1 is a plan view of a prefabricated metal stairway in place in masonry construction with the masonry shown in dotted lines and with some parts broken away.

Referring to FIGS. 1–5 inclusive, the prefabricated stairway serves as a guide for the construction of the masonry M about said stairway, as shown in FIG. 1, and at the same time serves as temporary scaffolding and temporary stairway during the construction period and process. The frame of the prefabricated stairway comprises the vertical members 20, the horizontal base members 21, and the horizontal upper member 22. The members 20, 21 and 22 form a rectangular parallelepiped frame.

The horizontal landing platform 23 includes the horizontal structural member 24 which is secured to two of the vertical members 20 intermediate the ends thereof. The horizontal landing platform 23 also includes the structural member 25 which is secured to the structural member 26 which includes a first run of stairs 27 and to another structural member 28 which includes a second run of stairs 29.

The structural member 28 also includes a landing platform portion 30. The structural member 28 includes a horizontal member 31 which is secured to two of the upper horizontal frame members 22 and to a second landing platform 32 which is also secured to the upper horizontal frame members 22.

Figure 2:
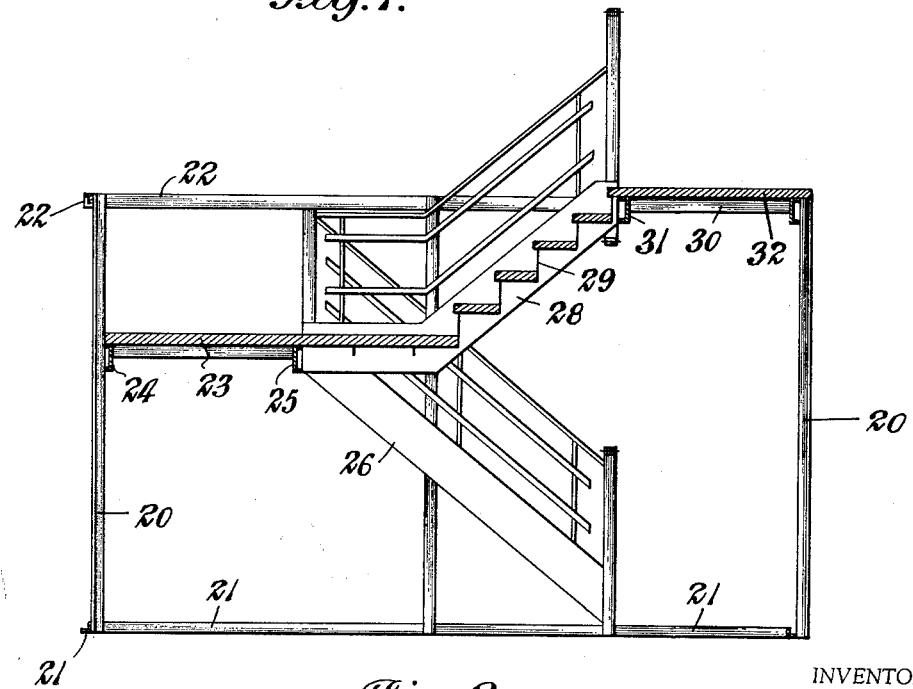
FIG. 2 is a view of the stairway shown in FIG. 1 in side elevation with parts shown in section.

As shown in FIG. 2, one prefabricated stairway may be superimposed on another to correspond to multiple story construction with attendant great saving in the elimination of temporary scaffolding and temporary stairways and the time required to set up temporary guides for keeping the masonry true.

Figure 3:
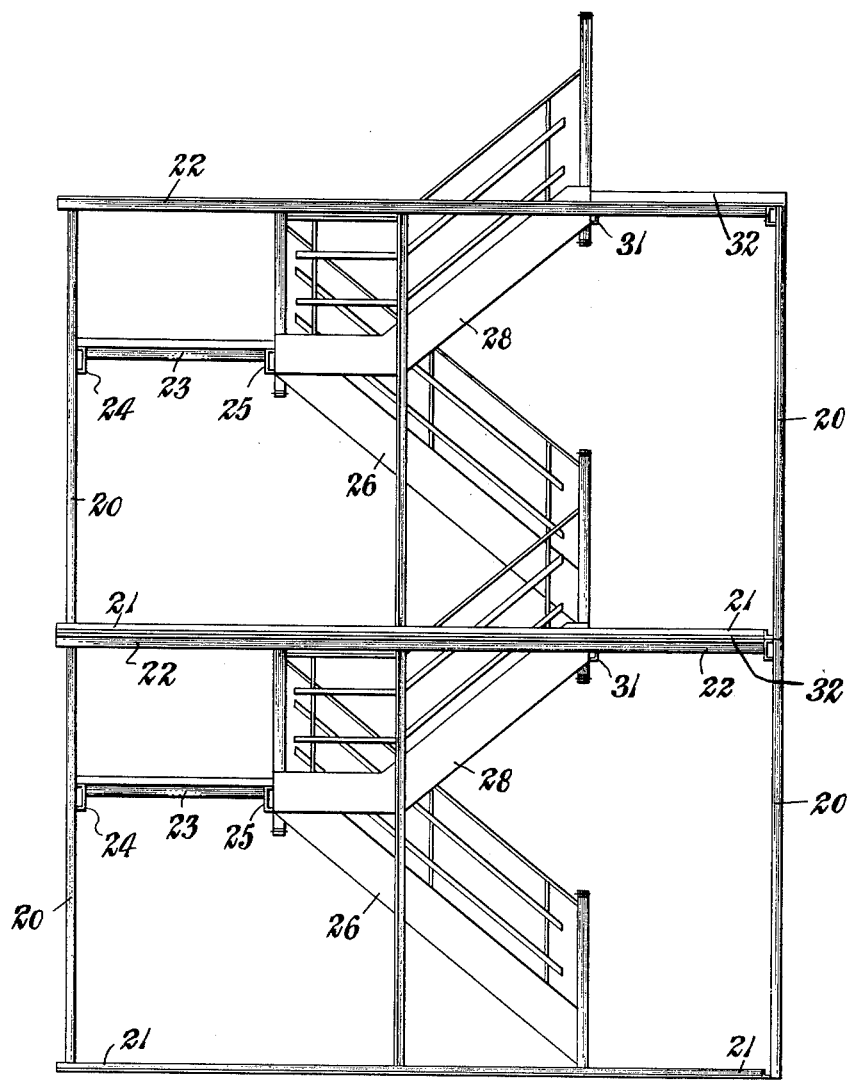
FIG. 3 is a view similar to FIG. 2 with a second prefabricated metal stairway superimposed thereon.

In the form of the invention shown in FIG. 2, the first riser of the stairway 27 is in the same vertical plane as the topmost riser of the stairway 29 and as shown in FIG. 3, wherein one prefabricated metal stairway unit is superimposed upon another, the first set of horizontal landing platforms 23 will be one above the other and the second set of landing platforms 32 will be one above the other and in some apartment house installations such an arrangement may be highly desirable.

Figure 6:
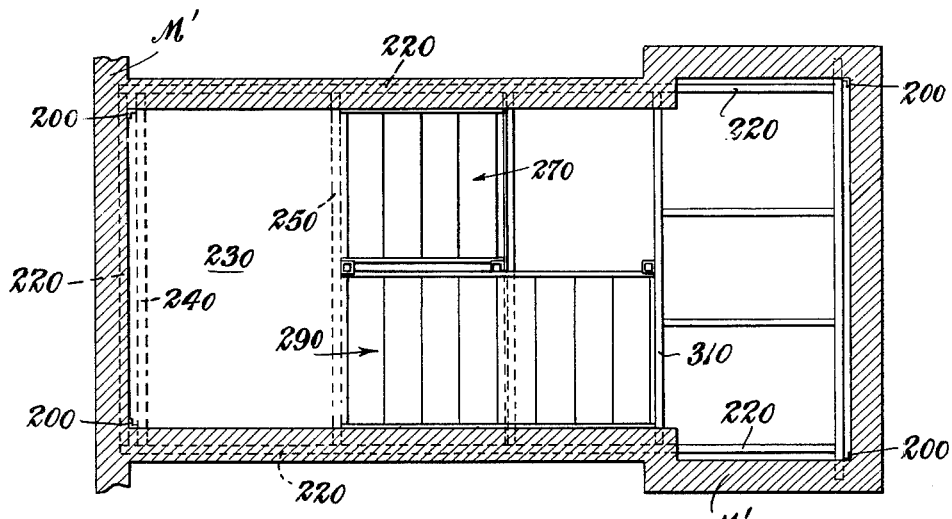
FIG. 6 is a view similar to FIG. 1 but of a modified form of stairway structure.
Figure 7:
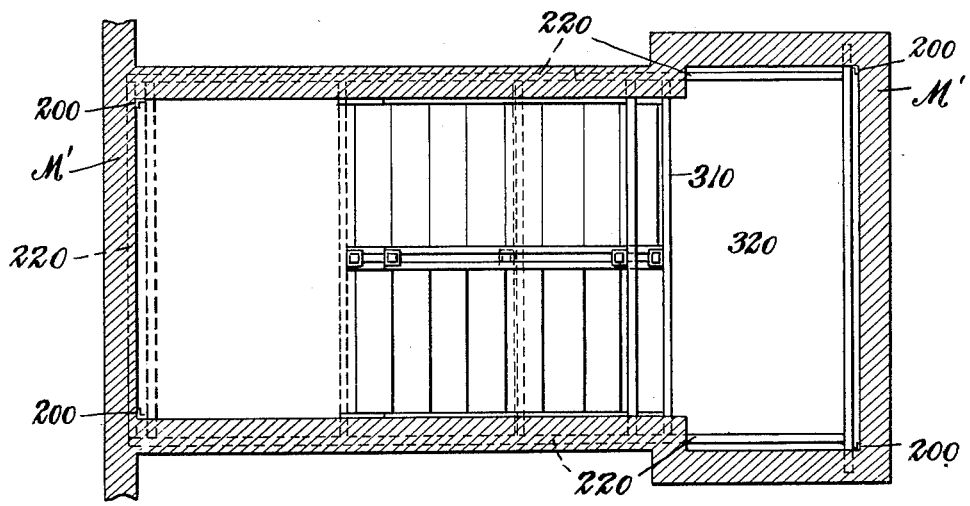
FIG. 7 is a view similar to FIG. 6 but of a superimposed second stairway structure on a first stairway structure.

Referring to FIGS. 6–10 inclusive, this form of prefabricated stairway serves as a guide for the construction of the masonry M' about said stairway, as shown in FIGS. 6 and 7, and at the same time serves as a temporary scaffolding and temporary stairway during the construction period and process. The frame of this prefabricated stairway comprises the vertical members 200, the horizontal base members 210, and the horizontal upper members 220. The members 200, 210 and 220 form a rectangular parallelepiped frame.

The horizontal landing platform 230 also includes the horizontal structural member 240 which is secured to two of the vertical members 200 intermediate the ends thereof. The horizontal landing platform 230 also includes the structural member 250 which is secured to a first run of stairs 270 and to a second run of stairs 290.

Secured to the run of stairs 290 is the horizontal member 310 which is secured to two of the upper horizontal frame members 220 and to a second landing platform 320 which is also secured to the upper horizontal frame members 220.

Figure 8:
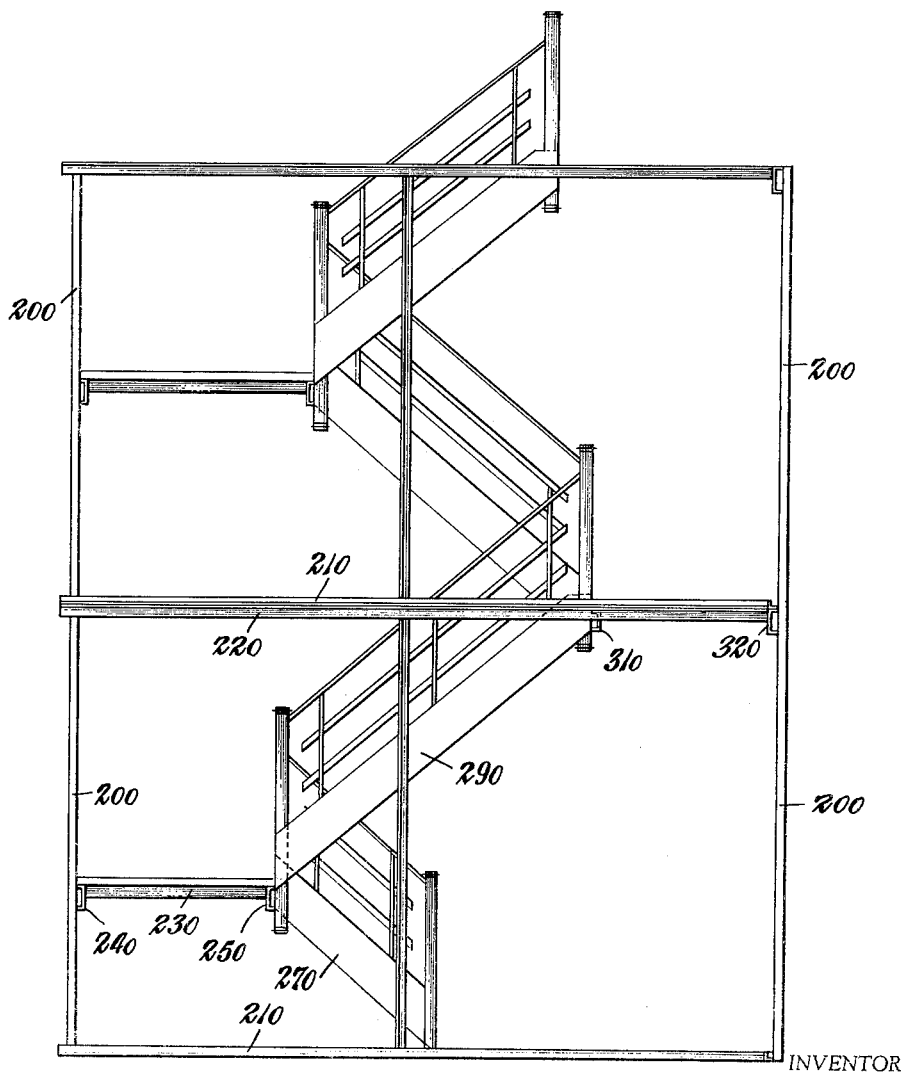
FIG. 8 is a side elevation of the structure shown in FIG. 7.
Figures 9, 10:
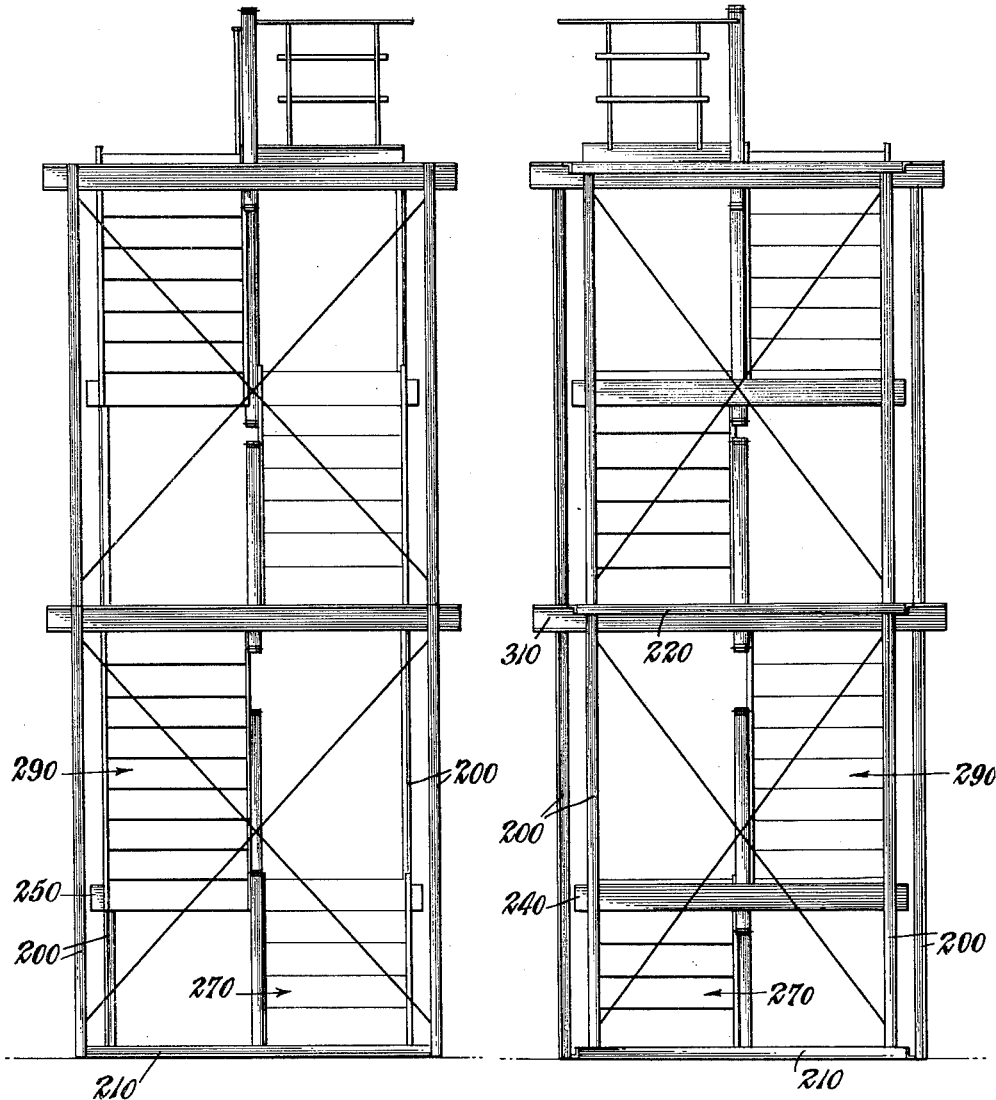
FIG. 9 is a front elevation of the structure shown in FIG. 8.
FIG. 10 is a rear elevation of the structure shown in FIG. 8.

As shown in FIGS. 8, 9 and 10, one prefabricated stairway may be superimposed upon another to correspond to multiple story construction with attendant great saving in the erection of temporary scaffolding and temporary stairways and the time required to set up temporary guides for keeping the masonry true.

When the prefabricated stairway units as shown in FIGS. 1–10 inclusive, are made of steel the structural assembly details may be as shown in FIGS. 11, 12 and 13.

Figure 14:
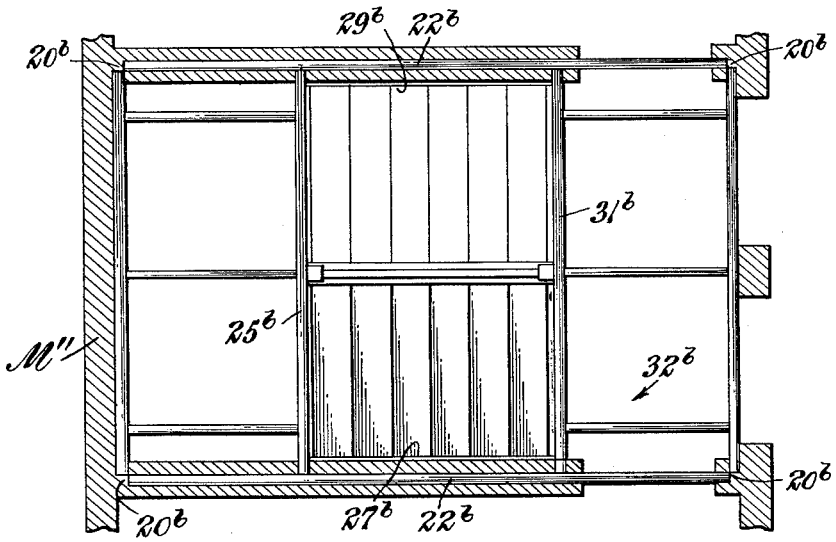
FIG. 14 is a view similar to FIG. 6 but of a modified form of stairway structure.

Referring to FIGS. 14, 15, 16 and 17, this form of prefabricated stairway serves as a guide for the construction of the masonry M″ about said stairway, as shown in FIG. 14, and at the same time serves as a temporary scaffolding and temporary stairway during the construction period and process. The frame of this prefabricated stairway comprises the vertical members 20b, the horizontal base members 21b and the horizontal upper members 22b. The members 20b, 21b, and 22b form a rectangular parallelepiped frame.

The horizontal landing platform 23b also includes the horizontal structural member 24b which is secured to two of the vertical members 20b intermediate the ends thereof. The horizontal landing platform 23b also includes the structural member 25b which is secured to a first run of stairs 27b and to a second run of stairs 29b.

Secured to the run of stairs 29b is the horizontal member 31b which is secured to two of the upper horizontal frame members 22b and to a second landing platform 32b which is also secured to the upper horizontal frame member 22b.

Figure 15:
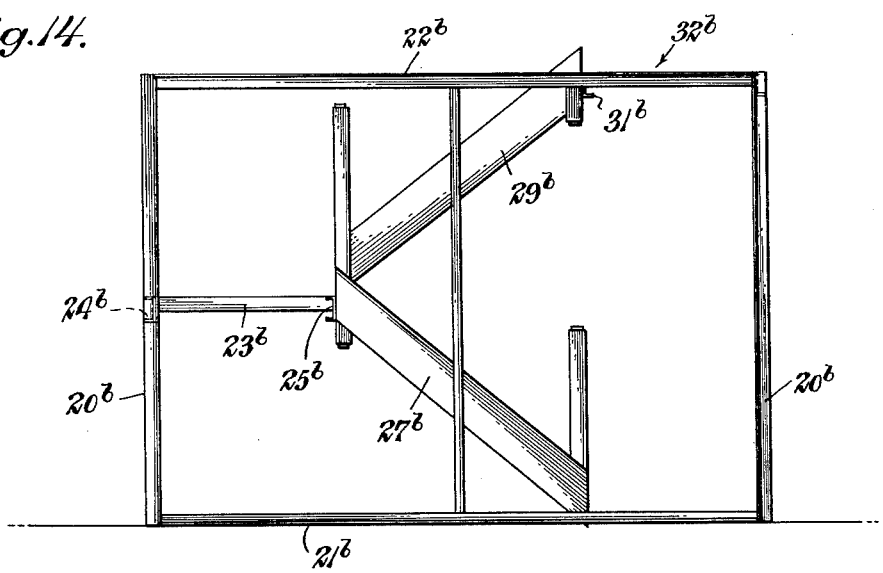
FIG. 15 is a view of the stairway shown in FIG. 14 in side elevation.

Though the prefabricated stairway shown in FIGS. 14 and 15 corresponds to but a single story in height, duplicate prefabricated stairways may be superimposed one upon the other to correspond to multiple story construction with attendant great saving in the erection of temporary scaffolding and temporary stairways and the time required to set up temporary guides for keeping the masonry true. In such multiple story construction, corresponding parts of one prefabricated stairway unit will be in vertical alignment with similar parts in a superimposed prefabricated stairway unit.

When the prefabricated stairway units as shown in FIGS. 14 and 15 are made of steel, the structural assembly details may be as shown in FIGS. 16 and 17.

In accordance with the instant invention, the walls surrounding the prefabricated stairway need not support the stairway though they may in part be so constructed as to contribute to the support thereof or the side walls may be the permanent support with the steel members forming a temporary support. Further, in accordance with the instant invention the frame structure supports the components of the stairway and in turn the elements of the stairway cooperate with each other and with the stairway unit to form a strong structure. The utilization of the prefabricated stairway eliminates the need for the metal worker recutting parts and retrimming and refitting and making adjustments to compensate for inaccuracies in the masonry.

In actual practice, the foundations of the building are laid and thereafter a one-story stairway unit is brought to the job and set in place and the masonry wall construction may thereafter start with the prefabricated steel stairway unit serving as a guide therefor. At the same time or prior to the masonry wall construction period, an additional stairway unit may be superimposed on the first stairway unit and this may readily be effected by the use of a simple crane such as is normally found on construction jobs of this character. In this way it is unnecessary to raise individual structural steel members and to assemble the stairway unit on the job and at the same time the guides are more accurately set up for the masonry construction and the masons may use the stairway temporarily without the need for temporary scaffolding, temporary stairs and platforms and the like.

With the prefabricated stairway units made of steel, they may be further finished at the time the construction is being finished so that the prefabricated units may have concrete landings or other landings or they may be finished with other conventional materials. When the prefabricated stairway units are brought to the job they may be complete with railings and newel posts. As the prefabricated stairway units are built in the factory there are great savings in metal and jig time as they are all uniform and true and there need be no cutting and fitting to suit the masonry alignment such as it may be on the job.

It has been found in practice that the prefabricated stairway units are an actual construction safety factor as they are stronger, more convenient to use and safer than temporary scaffolding which is subject to weathering and the hazards found on a construction job.

It will be obvious to those skilled in the art that various changes may be made without departing from the spirit of the invention and therefore the invention is not limited to what is shown in the drawings and described in the specification but only as indicated in the appended claims.

What is claimed is:

1. A permanent prefabricated metal stairway and masonry guide for forming a permanent masonry building construction including metal stairway comprising; in a prefabricated metal stairway for use in masonry construction, an open rectangular parallelepiped frame comprising four spaced horizontal base members, four spaced horizontal upper members and four vertical members, a horizontal landing platform having one side thereof secured to two of said vertical members at intermediate portions thereof, a first run of stairs secured to a base member of said frame at the lower end thereof and to said landing at the upper end thereof, a second run of stairs secured to said landing at the lower end thereof and to an upper member of said frame at the upper end thereof whereby said first run of stairs, said landing platform and said second run of stairs cooperate with each other and with said frame to make an open self-supporting masonry guide for the building of masonry thereabout.

2. The structure recited in claim 1, and a second landing platform secured to a plurality of said horizontal upper members and to the upper end of said second run of stairs.

3. The structure recited in claim 1, and including a second landing platform secured to said horizontal upper members and to the upper end of said second run of stairs, and a second structure as recited in claim 1 superimposed upon said first structure with the respective frames in vertical alignment.

References Cited in the file of this patent

UNITED STATES PATENTS

| | | |
|---|---|---|
| 653,442 | Dunk | July 10, 1900 |
| 1,380,074 | Myers | May 31, 1921 |
| 1,478,277 | Hall | Dec. 18, 1923 |
| 1,886,962 | La Roche | Nov. 8, 1932 |
| 2,760,707 | Anderson | Aug. 28, 1956 |

OTHER REFERENCES

"A Survey of Prefabrication," March 1945, page 61.